United States Patent
Eto

(10) Patent No.: US 12,285,813 B2
(45) Date of Patent: Apr. 29, 2025

(54) ENDMILL SPECIFICATION DESIGN METHOD, CUTTING CONDITION DETECTING METHOD, AND PROCESSING METHOD

(71) Applicant: MITSUBISHI HEAVY INDUSTRIES, LTD., Tokyo (JP)

(72) Inventor: Jun Eto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 226 days.

(21) Appl. No.: 17/883,958

(22) Filed: Aug. 9, 2022

(65) Prior Publication Data

US 2022/0379389 A1 Dec. 1, 2022

Related U.S. Application Data

(62) Division of application No. 16/609,210, filed as application No. PCT/JP2017/038581 on Oct. 25, 2017, now abandoned.

(51) Int. Cl.
*B23C 5/10* (2006.01)
*B23C 3/00* (2006.01)

(52) U.S. Cl.
CPC .......... *B23C 5/10* (2013.01); *B23C 3/00* (2013.01); *B23C 2220/64* (2013.01)

(58) Field of Classification Search
CPC ......... B23C 1/00; B23C 5/10; B23C 2220/64; B23Q 15/12
See application file for complete search history.

(56) References Cited

U.S. PATENT DOCUMENTS

| | | | | |
|---|---|---|---|---|
| 4,277,988 A | * | 7/1981 | Crowe | B21D 37/20 29/558 |
| 6,077,002 A | * | 6/2000 | Lowe | B23C 3/18 416/223 A |
| 6,349,600 B1 | | 2/2002 | Davies et al. | |
| 6,352,496 B1 | * | 3/2002 | Oldani | B23Q 1/5406 82/122 |

(Continued)

FOREIGN PATENT DOCUMENTS

| JP | 2003340627 A | 12/2003 |
|---|---|---|
| JP | 2014083674 A | 5/2014 |

(Continued)

OTHER PUBLICATIONS

International Search Report for PCT/JP2017/038581 mailed Nov. 28, 2017.

(Continued)

*Primary Examiner* — Nicole N Ramos
(74) *Attorney, Agent, or Firm* — HAUPTMAN HAM, LLP

(57) ABSTRACT

Provided is an endmill. The maximum spindle speed, per one minute, of a main spindle to which the endmill is attached is Smax. The number of teeth of the endmill is N. The outer shape of the endmill is Da. The natural frequency at which vibrations at the end of the endmill reach a maximum level is ω1. ω1 and/or N are set so that when the diameter-direction infeed amount of the endmill is set to Rd: i) ω1×60/N×6<Smax, if Rd is at least 4% of Da; and ii) ω1×60/N×3<Smax, if Rd is less than 4% of Da.

1 Claim, 5 Drawing Sheets

(56) References Cited

U.S. PATENT DOCUMENTS

| | | | |
|---|---|---|---|
| 7,822,502 B2 * | 10/2010 | Utsumi | B23Q 17/005 700/173 |
| 8,256,092 B1 | 9/2012 | Woodruff et al. | |
| 8,296,919 B2 | 10/2012 | Young et al. | |
| 8,875,367 B2 | 11/2014 | Young et al. | |
| 9,227,253 B1 | 1/2016 | Swift et al. | |
| 2005/0019121 A1 | 1/2005 | Suttor et al. | |
| 2007/0179661 A1 * | 8/2007 | Onozuka | G05B 19/40937 700/173 |
| 2007/0245799 A1 | 10/2007 | Asakawa | |
| 2007/0258777 A1 | 11/2007 | Gunther et al. | |
| 2011/0274506 A1 * | 11/2011 | Kakai | B23C 5/2273 407/113 |
| 2012/0197424 A1 * | 8/2012 | Kimura | G05B 19/184 700/103 |
| 2015/0338842 A1 | 11/2015 | Ono | |
| 2017/0220025 A1 | 8/2017 | Kawai et al. | |
| 2017/0266739 A1 | 9/2017 | Yamasaki et al. | |
| 2019/0091778 A1 | 3/2019 | Hayasaka et al. | |

FOREIGN PATENT DOCUMENTS

| | | |
|---|---|---|
| JP | 2014140918 A | 8/2014 |
| JP | 2015217500 A | 12/2015 |
| JP | 2016043443 A | 4/2016 |
| JP | 2017164841 A | 9/2017 |

OTHER PUBLICATIONS

Extended European Search Report for European Application No. 17929431.9 mailed Jun. 17, 2020; 8pp.

Kivanc, E.B. et al.; Science Direct; ELSEVIER for International Journal of Machine Tools & Manufacture 44 (2004) 1151-1161. Structural modeling of end mills for form error and stability analysis (Year: 2004); 11pp.

* cited by examiner

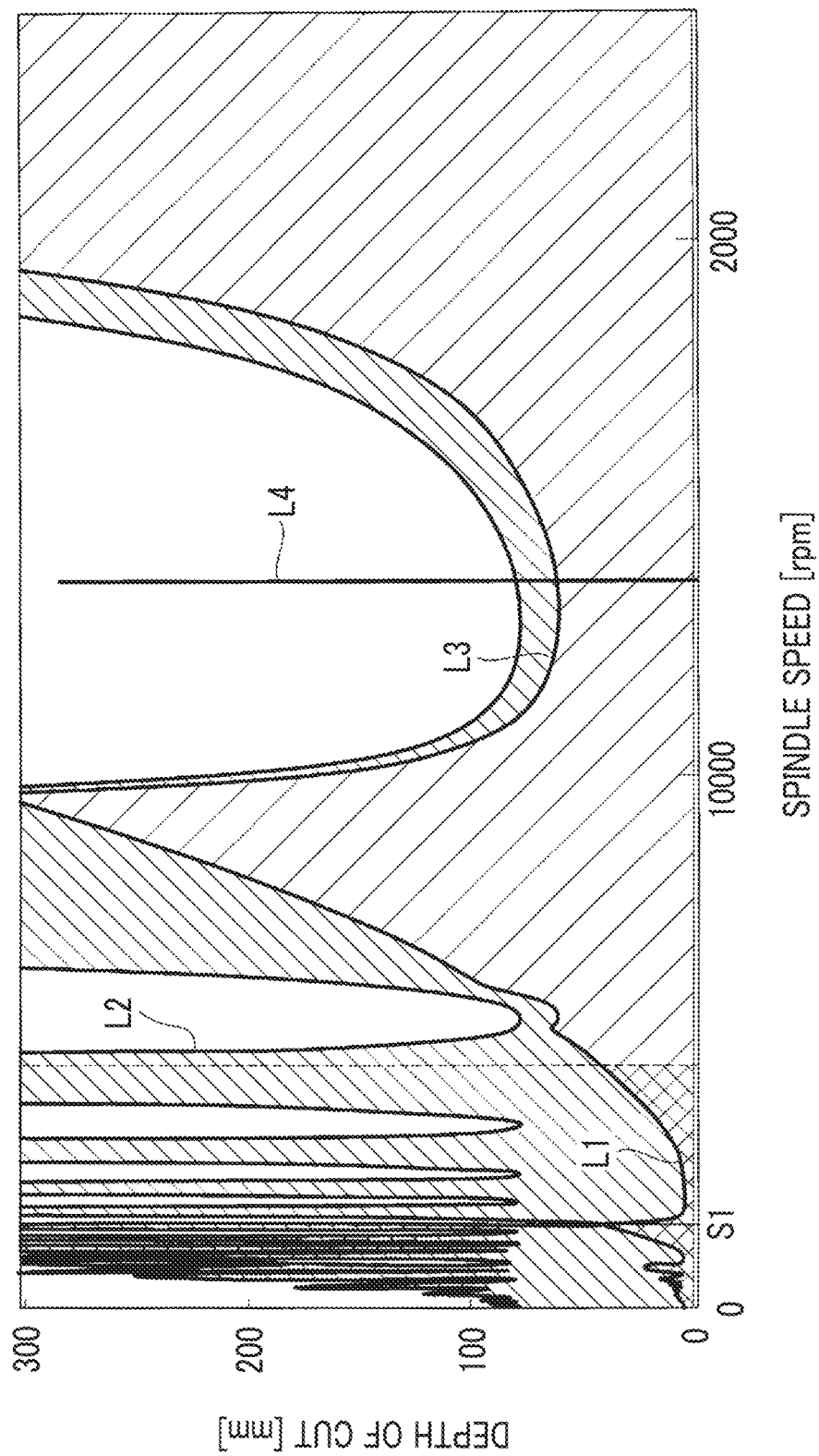

ENDMILL SPECIFICATION DESIGN METHOD, CUTTING CONDITION DETECTING METHOD, AND PROCESSING METHOD

TECHNICAL FIELD

The present invention relates to an endmill specification design method, a cutting condition detecting method, and a processing method.

BACKGROUND ART

In recent years, aircraft structural components are progressively integrated with each other, and component shapes thereof are more complicated. A product height increases. Consequently, there is an increasing need for shape processing using a protruding long tool protruding beyond L/D (overhang length/diameter)=5. These components become joint parts as primary structural members in many cases. Accordingly, processed surface characteristics of the components are important. However, the protruding long tool has a problem of a regenerative chatter vibration generated on the tool side, thereby causing a problem in that a processed surface may be defective and a processing time may be lengthened.

In general, rigidity is proportional to the cube of a protrusion amount. Accordingly, when the components are processed using the long tool, a worker uses a stable pocket serving as a rotation speed region which can avoid the regenerative chatter vibration. In this manner, the worker further reduces a load as much as possible. Therefore, the processing time is extremely lengthened. Moreover, since one surface is processed in multiple paths, a mismatch occurs between the paths. Accordingly, hand finishing is required after the surface is processed. In addition, the stable pocket is an integral fraction of natural vibration frequencies. Accordingly, as the rigidity is lowered (as natural vibration is small), rotation speed is lowered, thereby degrading efficiency.

In order to cope with this problem, the following processing method called single finishing has been recently promoted. In a case of side surface finishing, a side surface is finished in one step. However, this processing also has the following problems.

Large vibration is generated due to large axial cutting.

A stable region is narrowed and becomes unstable since a tool having a long overhang length has low damping performance.

Since the rigidity is weak, the tool is fallen down as much as 0.1 mm or longer. Accordingly, quick feeding is not available.

In addition, in a case of bottom surface finishing for a deep pocket, processing is performed using a whole diameter of the tool. Accordingly, the chatter vibration is likely to be generated. Therefore, cutting is generally performed by reducing radial cutting or feeding.

In view of these circumstances, as a tool which is less likely to vibrate, there are provided some inventions and products relating to a tooth shape. However, tool manufacturers in the related art have insufficient viewpoints of vibration characteristics. Therefore, dedicated tools have narrow application conditions. The single finishing is very unstable, and a user has difficulties in using the single finishing.

PTL 1 discloses a processing method of an endmill focusing on vibration characteristics. That is, PTL 1 discloses a method of using an effect (process damping) in which a tool and a workpiece are damped by coming into contact with each other during processing in a case of low-speed cutting.

CITATION LIST

Patent Literature

[PTL 1] Specification of U.S. Pat. No. 8,875,367

SUMMARY OF INVENTION

Technical Problem

However, according to PTL 1, the natural frequency is raised through weight reduction of the tool so that the process damping in a low-speed region is used in a medium-speed region. Consequently, there is a limitation in further using the process damping in a high-speed region.

In view of these problems, the present disclosure aims to perform processing by stably using an endmill at a high speed.

Solution to Problem

According to an aspect of the present invention, there is provided an endmill specification design method including setting $\omega 1$ and/or N so as to satisfy the following. When a maximum spindle speed per one minute of a main spindle having an endmill attached thereto is defined as Smax, the number of teeth of the endmill is defined as N, an outer shape of the endmill is defined as Da, a natural frequency at which a vibration is maximized in a tool tip of the endmill is defined as $\omega 1$, and a radial depth of cut of the endmill is defined as Rd, i) in a case where Rd is equal to or greater than 4% of Da, $\omega 1 \times 60/N \times 6 < Smax$ is satisfied, and ii) in a case where Rd is smaller than 4% of Da, $\omega 1 \times 60/N \times 3 < Smax$ is satisfied.

A stable spindle speed at which the endmill can stably perform machining without generating a regenerative chatter vibration is defined as $\omega 1 \times 60/N/n$ (n is a natural number). Through examinations, the present inventor has found that the rotation speed higher than a first stable spindle speed at which n is defined as 1 also has a wide stable region. Then, this stable region is changed by the radial depth of cut Rd of the endmill. Therefore, $\omega 1$ and/or N are set so as to satisfy the following.

i) In a case where Rd is equal to or greater than 4% of Da, $\omega 1 \times 60/N \times 6 < Smax$ is satisfied.

ii) In a case where Rd is smaller than 4% of Da, $\omega 1 \times 60/N \times 3 < Smax$ is satisfied.

In this manner, the main spindle can be increased to the rotation speed close to the maximum spindle speed Smax, and high speed and stable machining can be performed. For example, the natural frequency $\omega 1$ is decreased by increasing a protrusion amount of the endmill. The first stable spindle speed is decreased by increasing the number of teeth N. In this manner, a stable region having a higher rotation speed than the first stable spindle speed can be widely used.

In the endmill specification design method according to the aspect of the present invention, bottom surface machining may be performed in a case of i), and side surface machining may be performed in a case of ii).

In the case of i), the radial depth of cut is larger than that in the case of ii). Accordingly, the case of i) is suitable for bottom surface machining in pocket processing, particularly for bottom surface finishing in deep pocket processing. In the case of ii), the radial depth of cut is smaller than that in the case of i). Accordingly, the case of i) is suitable for side surface machining, particularly for single finishing processing in deep axial cutting of the endmill.

According to another aspect of the present invention, there is provided a cutting condition detecting method including setting a rotation speed of a main spindle having an endmill attached thereto so as to satisfy the following. When a maximum spindle speed per one minute of the main spindle is defined as Smax, the number of teeth of the endmill is defined as N, an outer shape of the endmill is defined as Da, a natural frequency at which a vibration is maximized in a tool tip of the endmill is defined as $\omega 1$, and a radial depth of cut of the endmill is defined as Rd, i) in a case where Rd is equal to or greater than 4% of Da, a range of $\omega 1 \times 60/N \times 6$ to Smax is satisfied, and ii) in a case where Rd is smaller than 4% of Da, a range of $\omega 1 \times 60/N \times 3$ to Smax is satisfied.

The stable spindle speed at which the endmill can stably perform the machining without generating the regenerative chatter vibration is $\omega 1 \times 60/N/n$ (n is a natural number). Through examinations, the present inventor has found that the rotation speed higher than the first stable spindle speed at which n is defined as 1 also has the wide stable region. Then, this stable region is changed by the radial depth of cut Rd of the endmill.

Therefore, the rotation speed of the main spindle is set so as to satisfy the following.

i) In a case where Rd is equal to or greater than 4% of Da, a range of $\omega 1 \times 60/N \times 6$ to Smax is satisfied.

ii) In a case where Rd is smaller than 4% of Da, a range of $\omega 1 \times 60/N \times 3$ to Smax is satisfied.

In this manner, a workpiece can be processed at the rotation speed higher than the first stable spindle speed, and the machining can be stably performed at high speed.

In the cutting condition detecting method according to the aspect of the present invention, bottom surface machining may be performed in a case of i), and side surface machining may be performed in a case of ii).

In the case of i), the radial depth of cut is larger than that in the case of ii). Accordingly, the case of i) is suitable for the bottom surface machining in the pocket processing, particularly for the bottom surface finishing in the deep pocket processing. In the case of ii), the radial depth of cut is smaller than that in the case of i). Accordingly, the case of ii) is suitable for the side surface machining, particularly for the single finishing processing in the deep axial cutting of the endmill.

In the cutting condition detecting method according to the aspect of the present invention, the rotation speed of the main spindle is set to a rotation speed so as to avoid $\omega' \times 60/N(m-0.5)$ (m is a natural number), when the natural frequency that is a frequency higher than $\omega 1$ serving as the natural frequency at which the vibration is maximized in the tool tip of the endmill, that has a vibration peak independent of $\omega 1$, and that has a peak value of the vibration which is equal to or greater than $\frac{1}{10}$ of a peak value of $\omega 1$ is defined as $\omega'$.

When the natural frequency that is a frequency higher than $\omega 1$ serving as the natural frequency at which the vibration is maximized in the tool tip of the endmill, that has a vibration peak independent of $\omega 1$, and that has a peak value of the vibration which is equal to or greater than $\frac{1}{10}$ of a peak value of $\omega 1$ is defined as $\omega'$, the stable spindle speed is also set as $\omega' \times 60/N/n$ for $\omega'$ (n is a natural number). Since $\omega'$ has the frequency higher than $\omega 1$, the stable spindle speed of $\omega'$ may appear at the frequency higher than $\omega 1$ in some cases. On the other hand, the regenerative chatter vibration appears between the adjacent stable spindle speeds (for example, between m=1 and 2). Therefore, a median value that may be an unstable region between the adjacent stable spindle speeds of $\omega'$ can be expressed by $\omega' \times 60/N(m-0.5)$. The rotation speed of the main spindle is set so as to avoid the median value. In this manner, the workpiece can be more stably processed.

According to still another aspect of the present invention, there is provided a processing method including performing machining on a workpiece by using any one of the cutting condition detecting methods.

The workpiece can be stably processed at high speed by using the above-described cutting condition detecting method. For example, in a case of the bottom surface finishing, an axial cutting amount is set to 1 mm or smaller, and a feeding amount per one tooth is set to 0.1 mm/tooth or smaller. In a case of the side surface finishing, the feeding amount per one tooth is set to 0.03 to 0.05 mm/tooth, and the axial cutting amount is set to a length corresponding to the protrusion amount of the endmill. Therefore, a single tool can cope with processing for workpieces having various depths. The above-described cutting amounts or feeding amounts are merely examples, and can be obtained through simulation or processing tests.

Advantageous Effects of Invention

The workpiece can be stably processed at high speed by using the endmill.

BRIEF DESCRIPTION OF DRAWINGS

FIG. 6 is a graph illustrating the stable region for two vibration peaks.

DESCRIPTION OF EMBODIMENTS

Figure 1:
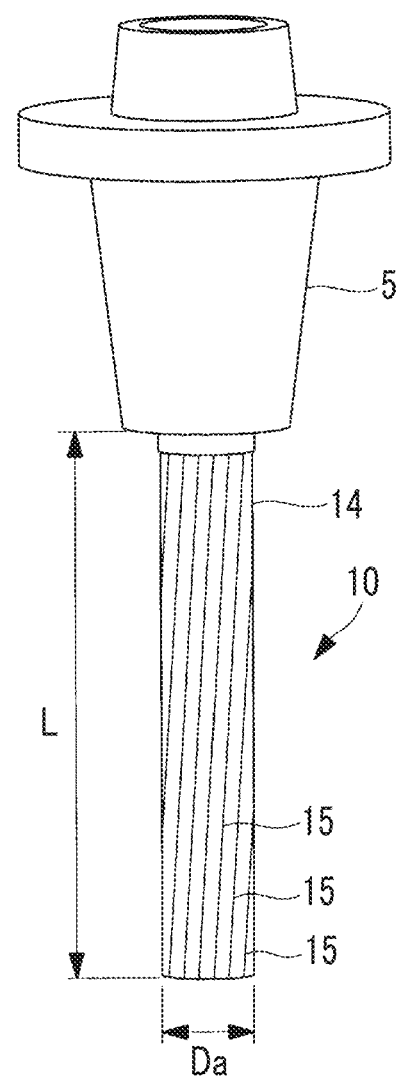
FIG. 1 is a schematic configuration diagram illustrating an endmill according to an embodiment of the present invention.

As illustrated in FIG. 1, an endmill 10 has a shaft 14 extending in an axial direction, and a plurality of teeth 15 disposed in an outer periphery of the shaft 14. One end of the endmill 10 is attached to a main spindle 5 by using a fixing tool such as a chuck. The main spindle 5 is connected to a rotary shaft of a machine tool (not illustrated), and is rotated at a predetermined rotation speed instructed by a control unit. A maximum spindle speed Smax of the main spindle 5 is determined depending on capacity of the machine tool, and is set to 10,000 to 40,000 (rpm), for example.

A length from the main spindle 5 to a tool tip of the endmill 10 is set as an overhang length L. The overhang length L is set to be changed in accordance with processing conditions. The endmill 10 is mainly used in processing aluminum alloy, and is used in performing pocket processing on a member having a thickness of 100 mm to 500 mm, for example. For example, specific processing targets include aircraft structural components (keel beams or main wing center beams). A ratio L/Da of the overhang length L to a tool diameter Da of the endmill 10 is set to 5 or greater.

The tool diameter Da of the endmill 10 is set to 16 mm to 25 mm, and the number of teeth N is set to 10 to 25.

In machining performed by the endmill 10, a stable spindle speed Sn at which the endmill 10 can stably perform the machining without generating a regenerative chatter vibration is determined as the following equation.

$$Sn = \omega 1 \times 60 / N/n \text{[rpm]} \quad (1)$$

$\omega 1$ is a natural frequency of the tool tip of the endmill 10, N is the number of teeth, and n is a natural number. For example, the natural frequency $\omega 1$ can be obtained by performing tapping on the endmill 10 attached to the main spindle 5, and is a frequency indicating a largest vibration peak.

The rotation speed region within a predetermined range around the stable spindle speed Sn becomes the stable pocket. If the main spindle 5 is rotated inside the stable pocket, the regenerative chatter vibration can be avoided.

Figure 2:
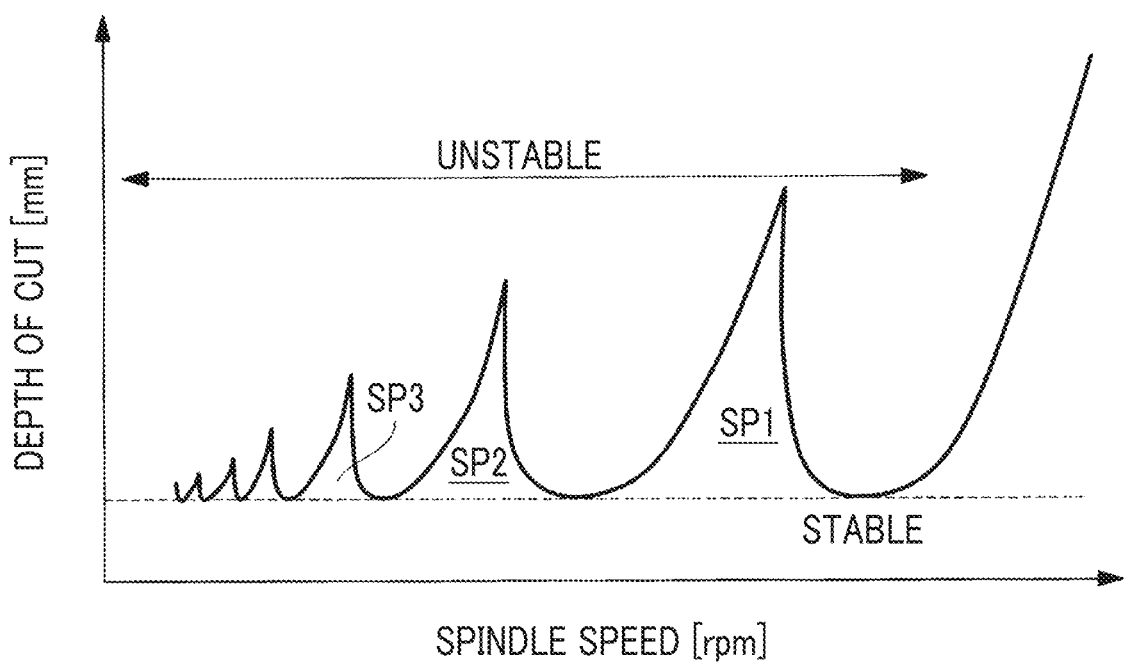
FIG. 2 is a graph illustrating a stable pocket.

FIG. 2 illustrates a plurality of the stable pockets.

In the drawing, a horizontal axis represents a main spindle rotation speed [rpm], and a vertical axis represents a horizontal cutting amount [mm]. The stable region is located below a curve, and an unstable region where the regenerative chatter vibration is generated is located above the curve.

The drawing illustrates a first stable pocket SP1 at a first stable spindle speed S1 defined as n=1 in Equation (1) above, a second stable pocket SP2 at a second stable spindle speed S2 defined as n=2, and a third stable pocket SP3 at a third stable spindle speed S3 defined as n=3. Each stable pocket is $1/n^{th}$ of the first stable pocket SP1 (refer to Equation (1)).

In a case of using the stable pocket SP illustrated in FIG. 2, there are problems as follows. In the endmill 10 where L/Da is 5 or greater, the overhang length L is long. Accordingly, the natural frequency $\omega 1$ decreases, and the main spindle rotation speed at which the stable pocket SP appears decreases. Therefore, the machining is less likely to be performed at high speed. In addition, a rotation speed width of the stable pocket SP is narrowed. Accordingly, the rotation speed is less likely to be adjusted. In addition, as the natural frequency $\omega 1$ decreases, the stable pocket SP is closer to the natural frequency $\omega 1$. Accordingly, a forced vibration is likely to be generated.

Figure 3:
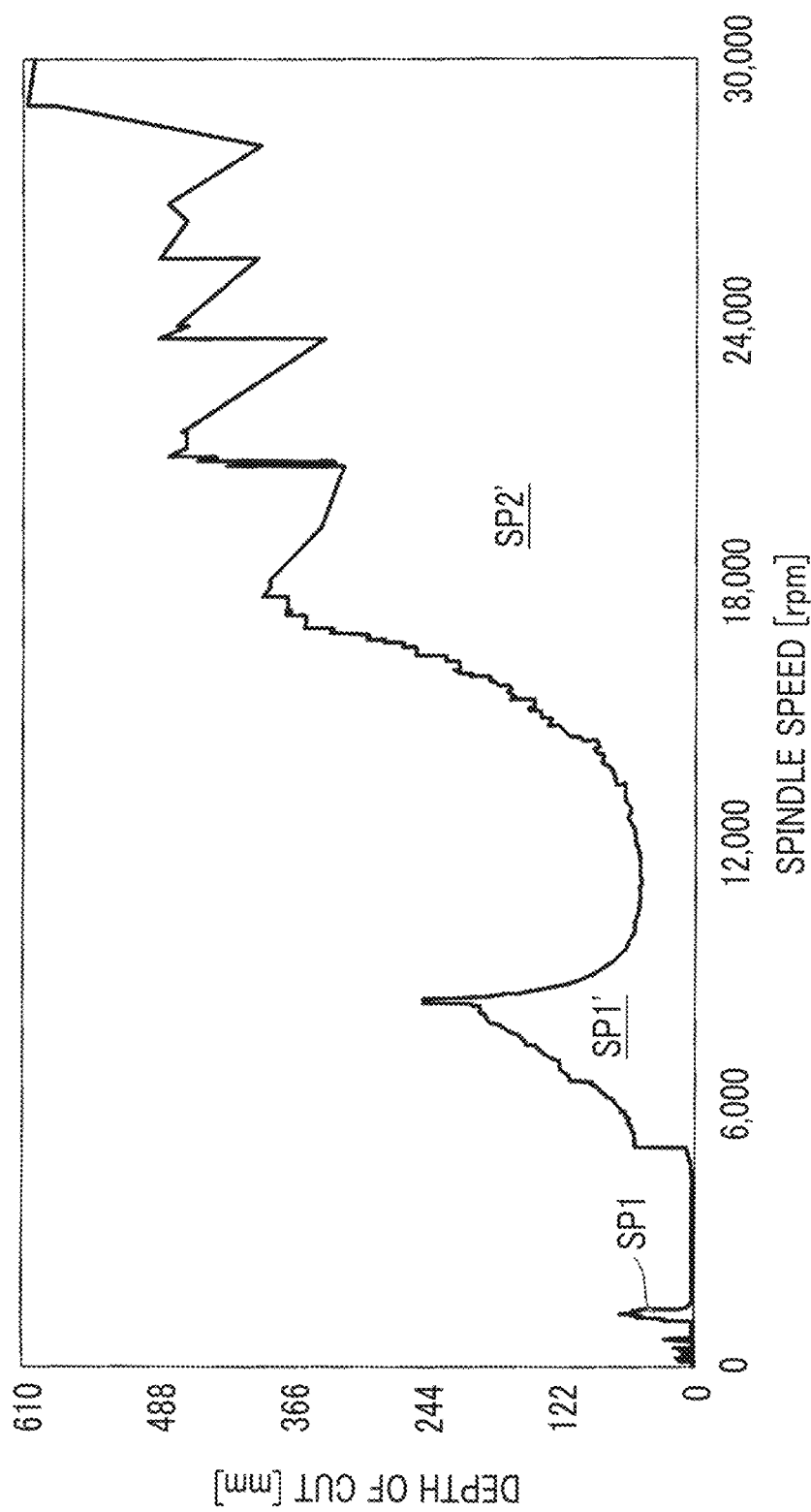
FIG. 3 is a graph illustrating a stable region existing on a rotation speed higher than that of the stable pocket in FIG. 2.

In contrast, the present inventor has found the following. As illustrated in FIG. 3, a stable pocket where the regenerative chatter vibration is not generated exists in a region exceeding the first stable pocket SP1 and further exceeding the natural frequency $\omega 1$. The horizontal axis represents the main spindle rotation speed [rpm], and the vertical axis represents the horizontal cutting amount [mm]. The stable region is located below a curve, and an unstable region where the regenerative chatter vibration is generated is located above the curve.

The drawing illustrates a simulation of the endmill 10 where the number of teeth N is defined as 19, the tool diameter Da is defined as 25 mm, and the overhang length L is defined as 170 mm. This simulation is performed using a stability limit analysis of the regenerative chatter vibration in endmill processing, based on the above-described tool geometry and frequency characteristics thereof.

As can be understood from the drawing, a first high-speed stable pocket SP1' exists in a region of 6,000 [rpm] to 10,000 [rpm] which greatly exceeds the first stable pocket SP1, and a large second high-speed stable pocket SP2' exists in a region of 18,000 [rpm] or higher. The present embodiment adopts the high-speed stable pockets SP1' and SP2'.

Furthermore, the present inventor has found the following. A shape of each stable pocket SPs illustrated in FIG. 3 is changed depending on the natural frequency $\omega 1$ and the radial depth of cut Rd [mm] of the endmill 10. Therefore, the simulation is performed for various types of the endmill 10 by changing the natural frequency $\omega 1$ and the radial depth of cut Rd. As a result, the present inventor has found that there is a predetermined relationship between the first stable spindle speed S1 and the first high-speed stable spindle speed S1' as illustrated in FIG. 4.

Figure 4:
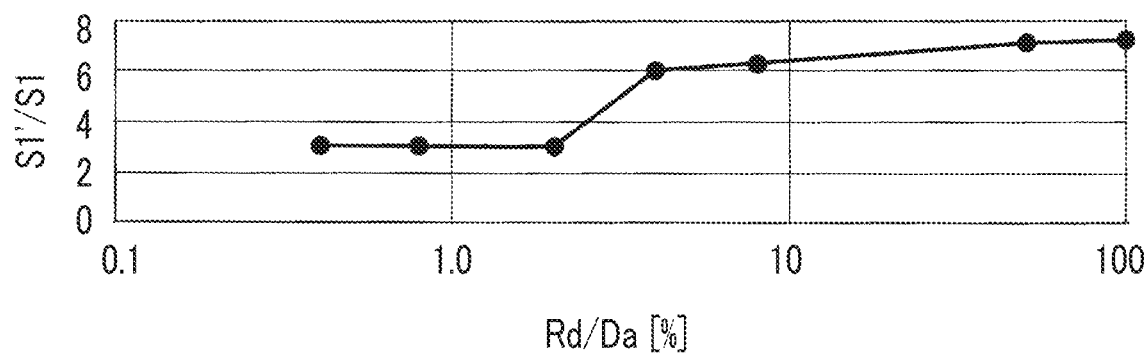
FIG. 4 is a graph illustrating a ratio of each stable spindle speed to a radial depth of cut.

In FIG. 4, the horizontal axis represents Rd/Da [%], which is the percentage of the radial depth of cut Rd to the tool diameter Da of the endmill 10, and the vertical axis represents a ratio of the first high-speed stable spindle speed S1' to the first stable spindle speed S1. As can be understood from the drawing, S1'/S1 is approximately 3 in a case where Rd/Da is smaller than 4%, and S1'/S1 is approximately 6 in a case where Rd/Da is equal to or greater than 4%. That is, the meaning is as follows. In the case where Rd/Da is smaller than 4%, the first high-speed stable spindle speed S1' exists around 3 times the first stable spindle speed S1. In the case where Rd/Da is equal to or greater than 4%, the first high-speed stable spindle speed S1' exists around 6 times the first stable spindle speed S1. If the first high-speed stable pocket SP1' including the first high-speed stable spindle speed S1' is used, the machining can be stably performed at high speed by using the endmill 10.

Figure 5:
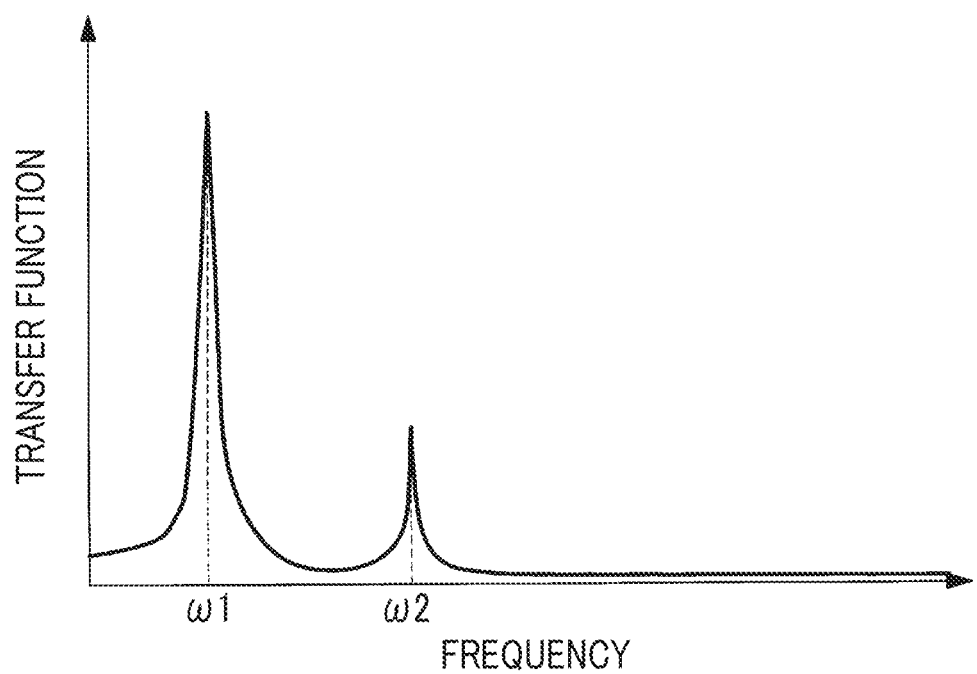
FIG. 5 is a graph illustrating vibration response characteristics of a tool tip of the endmill.

Next, referring to FIGS. 5 and 6, influence on a vibration peak of the endmill 10 at the frequency higher than the natural frequency $\omega 1$ will be examined. The above-described natural frequency $\omega 1$ is the frequency which indicates the highest vibration peak in a case where the frequency of the tool tip of the endmill 10 is analyzed. In some cases, the frequency indicating an independent vibration peak may exist in the frequency higher than the natural frequency $\omega 1$. Specifically, as illustrated in FIG. 5, in some cases, the independent vibration peak on the frequency side higher than the natural frequency $\omega 1$ which is the first vibration peak may be recognized as a second peak frequency $\omega 2$. As expressed in Equation (1), the stable spindle speed also exists in the second peak frequency $\omega 2$, and an unstable region exists in a region having no stable spindle speed. FIG. 6 illustrates a result of examining the stable region and the unstable region for the second peak frequency $\omega 2$.

In FIG. 6, the horizontal axis represents the main spindle rotation speed [rpm], and the vertical axis represents the horizontal cutting amount [mm]. The drawing illustrates a curve L1 indicating the stable region corresponding to the natural frequency $\omega 1$, a curve L2 indicating the stable region corresponding to the second peak frequency $\omega 2$, and a curve L3 obtained by superimposing the curves L1 and L2 on each other. As can be understood from the drawing, a region where L3 is greatly recessed downward exists around 14000 [rpm] indicated by a line segment L4. The reason is the influence caused by the curve L2 of the second peak frequency $\omega 2$. The rotation speed region indicated by the line segment L4 is the unstable region. Accordingly, it is preferable to avoid the rotation speed region. Therefore, the main spindle rotation speed is limited as follows.

The natural frequency that is a frequency higher than $\omega 1$ serving as the natural frequency at which the vibration is maximized in the tool tip of the endmill 10, that has the vibration peak independent of the natural frequency $\omega 1$, and that has the peak value of the vibration which is equal to or greater than 1/10 of the peak value of $\omega 1$ is defined as $\omega'$. It is assumed that the m-number of $\omega'$ exists (m is a natural number). In this case, the rotation speed of the main spindle 5 is set so as to be the rotation speed avoiding $\omega' \times 60/N/(m-0.5)$. In this manner, it is possible to avoid the center rotation speed between the adjacent stable pockets.

[Endmill Specification Design Method]

Next, an endmill specification design method used based on the above-described concept will be described. Smax represents the maximum spindle speed of the main spindle 5. $\omega 1$ and/or N are set so as to satisfy $\omega 1 \times 60/N \times 6 < Smax$, i) in a case where the radial depth of cut Rd is equal to or greater than 4% of the tool diameter Da, and so as to satisfy $\omega 1 \times 60/N \times 3 < Smax$, ii) in a case where the radial depth of cut Rd is smaller than 4% of the tool diameter Da.

In this manner, the rotation speed can be increased up to the main spindle rotation speed close to the maximum spindle speed Smax of the main spindle 5. Accordingly, the machining can be stably performed at high speed. For example, the natural frequency $\omega 1$ is decreased by increasing the protrusion amount of the endmill. The first stable spindle speed S1 is decreased by increasing the number of teeth N. In this manner, the first high-speed stable pocket SP1' having the higher rotation speed than the first stable spindle speed S1 can be widely used.

In this case, bottom surface machining is preferably performed in the above-described case of i), and side surface machining is preferably performed in the above-described case of ii).

In the case of i), the radial depth of cut Rd is larger than that in the case of ii). Accordingly, the case of i) is suitable for the bottom surface machining in the pocket processing, particularly for the bottom surface finishing in the deep pocket processing. In the case of ii), the radial depth of cut Rd is smaller than that in the case of i). Accordingly, the case of ii) is suitable for the side surface machining, particularly for the single finishing processing in the deep axial cutting of the endmill.

[Cutting Condition Detecting Method]

Next, a cutting condition detecting method used based on the above-described concept will be described. Smax represents the maximum spindle speed of the main spindle 5. The rotation speed of the main spindle 5 is set so as to satisfy a range of $\omega 1 \times 60/N \times 6$ to Smax, i) in a case where the radial depth of cut Rd is equal to or greater than 4% of the tool diameter Da, and so as to satisfy a range of $\omega 1 \times 60/N \times 3$ to Smax, ii) in a case where the radial depth of cut Rd is smaller than 4% of the tool diameter Da.

The processing conditions are set to the above-described conditions. In this manner, a workpiece can be processed in the first high-speed stable pocket SP1' having the higher rotation speed than the first stable spindle speed S1. Therefore, the machining can be stably performed at high speed.

In this case, bottom surface machining is preferably performed in the above-described case of i), and side surface machining is preferably performed in the above-described case of ii).

In the case of i), the radial depth of cut Rd is larger than that in the case of ii). Accordingly, the case of i) is suitable for the bottom surface machining in the pocket processing, particularly for the bottom surface finishing in the deep pocket processing. In the case of ii), the radial depth of cut Rd is smaller than that in the case of i). Accordingly, the case of ii) is suitable for the side surface machining, particularly for the single finishing processing in the deep axial cutting of the endmill.

Furthermore, it is preferable to add the following conditions when the processing conditions are set. The rotation speed of the main spindle 5 is set so as to avoid $\omega' \times 60/N(m-0.5)$ (m is a natural number), when the natural frequency that is the frequency higher than the natural frequency $\omega 1$ at which the vibration is maximized in the tool tip of the endmill 10, that has the vibration peak independent of $\omega 1$, and that has the peak value of the vibration which is equal to or greater than 1/10 of the peak value of $\omega 1$ is defined as $\omega'$.

Since $\omega'$ has the frequency higher than $\omega 1$, the stable spindle speed of $\omega'$ may appear at the frequency higher than $\omega 1$ in some cases. On the other hand, the regenerative chatter vibration appears between the adjacent stable spindle speeds (for example, between m=1 and 2) (refer to FIG. 6). Therefore, a median value that may be an unstable region between the adjacent stable spindle speeds of $\omega'$ can be expressed by $\omega' \times 60/N(m-0.5)$. The rotation speed of the main spindle 5 is set so as to avoid the median value. In this manner, the processing can be more stably performed.

[Processing Method]

Next, a processing method used based on the above-described concept will be described. As the processing method, the machining is performed using the endmill 10 under the conditions of the above-described cutting condition detecting method. In this case, the endmill 10 obtained based on the above-described endmill specification design method is used. In this manner, the processing can be stably performed at high speed.

For example, in a case of the bottom surface finishing, the axial cutting amount is set to 1 mm or smaller, and the feeding amount per one tooth is set to 0.1 mm/tooth or smaller. In a case of the side surface finishing, the feeding amount per one tooth is set to 0.03 to 0.05 mm/tooth, and the axial cutting amount is set to the length corresponding to the protrusion amount of the endmill. Therefore, a single tool can cope with processing for workpieces having various depths. The above-described cutting amounts or feeding amounts are merely examples, and can be obtained through simulation or processing tests.

REFERENCE SIGNS LIST

5: main spindle
10: endmill
14: shaft
15: tooth
Da: tool diameter (of endmill)
L: overhang length (of endmill)
Smax: maximum spindle speed (of main spindle)
Rd: radial depth of cut
$\omega 1$: natural frequency (of endmill tool tip)
S1: first stable spindle speed
S1': first high-speed stable spindle speed
SP, SP1, SP2, SP3: stable pocket
SP1': first high-speed stable pocket
SP2': second high-speed stable pocket

The invention claimed is:

1. A processing method of reducing chatter and vibration when performing high-speed machining on a workpiece, the processing method comprising:
attaching an endmill to a main spindle of a machine tool to cut the workpiece, wherein said endmill has a tool tip, an outer diameter Da, and an N number of teeth;
setting a radial depth of cut Rd in the machine tool;

adjusting a natural frequency ω1 by changing a protrusion amount of the endmill from the main spindle of the machine tool;

setting a predetermined rotation spindle speed instructed by a control unit, and determining a maximum spindle speed Smax of the main spindle depending on a capacity of the machine tool;

detecting at least one of:
- a first cutting condition of the machine tool when rotating the main spindle at the predetermined rotation spindle speed instructed by the control unit, the first cutting condition being detected by:
  - setting the natural frequency ω1 of the tool tip of the endmill attached to the main spindle so as to satisfy ω1×60/N×6<Smax, when the radial depth of cut Rd is set as equal to or greater than 4% of the outer diameter Da, or
- a second cutting condition of the machine tool when rotating the main spindle at the predetermined rotation spindle speed instructed by the control unit, the second cutting conditions being detected by:
  - setting the natural frequency ω1 of a tool tip of the endmill attached to the main spindle so as to satisfy ω1×60/N×3<Smax, when the radial depth of cut Rd is set as less than 4% of the outer diameter Da, and performing the high-speed radial depth of cut Rd machining on the workpiece with the endmill, by rotating the main spindle based on the set predetermined rotation spindle speed of the main spindle.

\* \* \* \* \*